(12) United States Patent
Kihara et al.

(10) Patent No.: US 7,713,892 B2
(45) Date of Patent: May 11, 2010

(54) LAMINATE SHEET

(75) Inventors: Yasuyuki Kihara, Sakai (JP); Yoshiki Takahashi, Sakai (JP); Hidenori Takayama, Sakai (JP); Masanori Imai, Sakai (JP); Yasunori Tanaka, Tokyo (JP); Shinji Naruse, Tokyo (JP); David Wayne Anderson, Richmond, VA (US)

(73) Assignees: Nitto Shinko Corporation, Sakai-shi (JP); E.I. du Pont de Nemours and Company, Wilmington, DE (US); Dupont Teijin Advanced Papers (Japan) Limited, Tokyo (JP)

( * ) Notice: Subject to any disclaimer, the term of this patent is extended or adjusted under 35 U.S.C. 154(b) by 0 days.

(21) Appl. No.: 11/915,074

(22) PCT Filed: May 17, 2006

(86) PCT No.: PCT/JP2006/309858

§ 371 (c)(1),
(2), (4) Date: Oct. 31, 2008

(87) PCT Pub. No.: WO2006/123715

PCT Pub. Date: Nov. 23, 2006

(65) Prior Publication Data

US 2009/0047858 A1    Feb. 19, 2009

(30) Foreign Application Priority Data

May 20, 2005    (JP)    ............................ 2005-148389

(51) Int. Cl.
*B32B 27/04*    (2006.01)
*C08F 283/04*    (2006.01)
*C08F 283/00*    (2006.01)

(52) U.S. Cl. ....................... 442/149; 442/381; 428/414; 525/420; 525/530

(58) Field of Classification Search ................. 442/149, 442/381; 428/414; 525/530, 420
See application file for complete search history.

(56) References Cited

U.S. PATENT DOCUMENTS 4,897,301 A * 1/1990 Uno et al. .................... 428/209

(Continued)

FOREIGN PATENT DOCUMENTS

JP    49-105882 A    10/1974

(Continued)

OTHER PUBLICATIONS

International Preliminary Report on Patentability (Form PCT/IB373) of International Application No. PCT/JP2006/309858 International filing date May 17, 2006 with Forms PCT/ISA/237 with English translation.

(Continued)

*Primary Examiner*—Norca L Torres-Velazquez
(74) *Attorney, Agent, or Firm*—Westerman, Hattori, Daniels & Adrian, LLP

(57)    ABSTRACT

A laminate sheet that can be easily produced together with improving the heat resistance and the water absorbency. Provided is a laminate sheet prepared by laminating plural sheet materials by a resin composition, wherein the resin composition is comprised of an aromatic polyamide resin and an epoxy group-containing phenoxy resin having an epoxy group in the molecule, and the resin composition is a polyamide resin composition that contains 30 to 50% by mass of the epoxy group-containing phenoxy resin.

9 Claims, 3 Drawing Sheets

U.S. PATENT DOCUMENTS

| | | |
|---|---|---|
| 6,288,145 B1 * | 9/2001 | Miyabo .................. 523/457 |
| 2004/0060655 A1 | 4/2004 | Kawka et al. |
| 2004/0071952 A1 | 4/2004 | Anderson et al. |

FOREIGN PATENT DOCUMENTS

| | | | |
|---|---|---|---|
| JP | 59-206460 | * | 11/1984 |
| JP | 63-118368 A | | 5/1988 |
| JP | 63-202655 A | | 8/1988 |
| JP | 3-237161 A | | 10/1991 |
| JP | 7-89025 A | | 4/1995 |
| JP | 9-23601 A | | 1/1997 |
| JP | 2002-179818 A | | 6/2002 |
| JP | 2003-313770 A | | 11/2003 |
| JP | 2004-83870 A | | 3/2004 |
| WO | 2004-030909 A1 | | 4/2004 |
| WO | 2004-031466 A1 | | 4/2004 |

OTHER PUBLICATIONS

International Search Report of PCT/JP2006/309858, date of mailing Aug. 29, 2006.

* cited by examiner

LAMINATE SHEET

TECHNICAL FIELD

The present invention relates to a laminate sheet prepared by laminating plural sheet materials by a resin composition.

BACKGROUND OF THE INVENTION

Conventionally, a laminate sheet prepared by laminating plural sheet materials has been used for various uses. For such a laminate sheet, the material characteristics of the respective layers can be reflected in the characteristics of the laminate sheet by laminating different sheet materials. The patent reference 1 discloses that a sheet material having an excellent heat resistance and a sheet material having an excellent insulating performance are laminated together for use as an interphase insulation sheet for a motor.

In addition, for such a laminate sheet, a resin composition is commonly used for laminating plural sheet materials. Therefore, for the resin composition, the characteristics adapted to the intended use is also required.

Furthermore, since the thickness accuracy of the resin composition also affects the characteristics of the laminate sheet, for example, the extruding of the resin composition with a uniform thickness such as by a T-die has been carried out in a laminating process.

Meanwhile, polyamide resins are known to easily form hydrogen bond at amide group in the main molecular chain, to have strong intermolecular force owing to the hydrogen bond, and to easily show crystallinity. Because of the property to easily show crystallinity, the polyamide resins are superior to other resins in terms of heat resistance, resistance to hydrolysis, and other characteristics, and have dynamic strength.

Especially, an aromatic polyamide having an aromatic ring in the main molecular chain has a higher heat resistance and can also lower water absorbency because it has a rigid aromatic ring in the main molecular chain, as compared with an aliphatic polyamide in which an aliphatic compound is used. Accordingly, the aromatic polyamide has been widely used in the fields in which a high heat resistance and a lower water absorbency are required in order to improve these characteristics.

However, when this aromatic polyamide is to be used as a resin composition to laminate the sheet material, it tends to have fewer entanglements of molecules in molten state than those of aliphatic resins because it has a rigid aromatic ring in the main molecular chain. Therefore, for a resin composition that uses an aromatic polyamide in a temperature region higher than the melting point the flowability becomes excessively high, a moderate flowability with 30 or smaller MFR that is suitable for the extruding by such as T-die can not be achieved, and accordingly it is difficult to extrude onto a sheet material.

To this point, there is a proposal that the extruding is performed by lowering the extruding temperature to near the melting point. The polyamide resins, however, show abrupt phase change near the melting point compared with other resins because they easily show crystallinity. Furthermore, for an aromatic polyamide resin, the flowability over the melting point is higher comparing aliphatic polyamide resins, and the flowability at near the melting point is also precipitous, from the reason as mentioned above. Therefore, from the fact that when the extruding is performed by lowering the temperature, the flowability greatly changes even by the little temperature change of an extruder and variations in extrusion rate occurs, it becomes difficult to extrude with a uniform thickness. Accordingly, in order to maintain the thickness accuracy of the laminate sheet, precise temperature control is required. However it is practically difficult to precisely maintain the extruding temperature.

That is, conventionally, for a laminate sheet prepared by laminating plural sheet materials with a resin composition, an aromatic polyamide has been used as the resin composition to laminate the sheet materials, and it has a problem that it is difficult to obtain easily producible products while improving the heat resistance and the water absorbency.

Patent document 1

Japanese patent application laid-open no. no. hei-9-23601

DISCLOSURE OF THE INVENTION

Problems to be Solved by the Invention

An object of the present invention is to provide an easily producible laminate sheet while improving the heat resistance and the water absorbency.

Means of Solving the Problem

The present inventors have conducted extensive study and found that the flowability of a resulting polyamide resin composition in the molten state can be improved by adding an epoxy group-containing phenoxy resin to an aromatic polyamide resin, thereby completed the present invention.

Specifically, to achieve the above object, the present invention provides a laminate sheet prepared by laminating plural sheet materials by a resin composition, in which the resin composition is comprised of an aromatic polyamide resin and an epoxy group-containing phenoxy resin having an epoxy group in the molecule, and the resin composition is a polyamide resin composition that contains 30 to 50% by mass of the epoxy group-containing phenoxy resin.

EFFECTS OF THE INVENTION

According to the present invention, the heat resistance and the water absorbency can be improved because an aromatic polyamide is used as the resin composition to laminate the sheet materials. In addition, because the resin composition is comprised of an aromatic polyamide resin and an epoxy group-containing phenoxy resin having an epoxy group in the molecule and is a polyamide resin composition that contains 30 to 50% by mass of the epoxy group-containing phenoxy resin, it can suppress the excessive flowability of the resin composition at a higher temperature than the melting point of the epoxy group-containing phenoxy resin aromatic polyamide. Accordingly, the necessity to precisely control the temperature to maintain the thickness accuracy of the resin composition can be decreased. That is, it becomes possible that a laminate sheet can be easily produced.

DESCRIPTION OF THE REFERENCE NUMERALS

Figure 1:
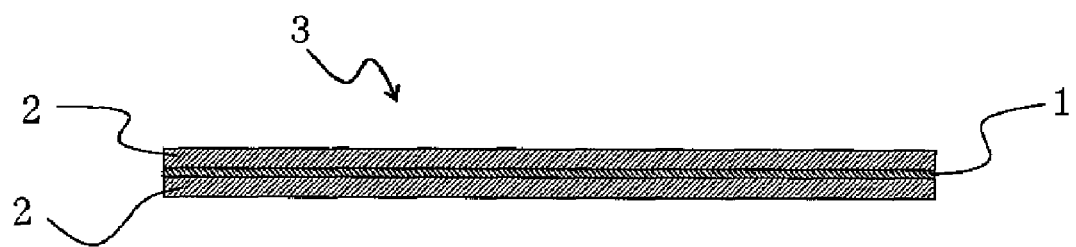
FIG. 1 is a schematic cross-sectional view showing a laminate sheet of one embodiment.

1: polyamide resin composition, 2: wholly aromatic polyamide paper, 3: laminate sheet, 16: T-die extruder Best Mode for Carrying out the Invention A preferred embodiment according to the present invention will be described below by taking, for example, a laminate sheet for insulating paper used for a car motor or the like, with reference to FIG. 1.

A laminate sheet 3 has two pieces of wholly aromatic polyamide paper 2 that are laminated with an aromatic polyamide resin composition, in which an epoxy group-containing phenoxy resin is added to an aromatic polyamide resin.

Applicable aromatic polyamide resin of the aromatic polyamide resin composition 1 includes an aromatic polyamide prepared by, for example, dehydration condensation polymerization of a diamine with a dicarboxylic acid while adopting an aromatic compound to any of the diamine and the dicarboxylic acid.

Applicable diamine includes an aliphatic diamine, an alicyclic diamine, and an aromatic diamine. Applicable aliphatic diamine or alicyclic diamine includes the one expressed by the general formula (1). The $R_1$ in the formula (1) designates an aliphatic or alicyclic alkyl expressed by $C_nH_{2n}$ (n=6-12):

$$H_2N-R_1-NH_2 \quad (1)$$

As applicable diamine, hexiamethylen diamine and/or mixing with 2-methylpentamethylene diamine are always preferred in bringing out superior characteristic under high temperature.

Applicable aromatic diamine includes xylylene diamine.

Applicable dicarboxylic acid includes an aliphatic dicarboxylic acid, an alicyclic dicarboxylic acid, and an aromatic dicarboxylic acid. Applicable aliphatic dicarboxylic acid or alicyclic dicarboxylic acid includes the one expressed by the general formula (2). The $R_2$ in the formula (2) designates an aliphatic or alicyclic alkyl expressed by $C_nH_{2n}$ $(n=4\text{-}25)$:

$$HOOC-R_2-COOH \quad (2)$$

Applicable aromatic dicarboxylic acid includes terephthalic acid, methyl terephthalic acid, and naphthalene dicarboxylic acid.

As applicable aromatic dicarboxylic acid, mixing terephtalic acid with isophthalic acid is always preferred in bringing out superior characteristic under high temperature.

The aromatic polyamide resin may contain one kind of diamine and one kind of dicarboxylic acid, and alternatively may contain plural kinds of diamine and plural kinds of dicarboxylic acid in combination. If necessary other component than diamine and dicarboxylic acid may be added to the resin.

Applicable epoxy group-containing phenoxy resin includes the one expressed by the general formula (3), or the like. In the general formula (3), $R_3$, $R_4$ represent terminal groups, and an epoxy group is introduced to at least one of $R_3$ and $R_4$:

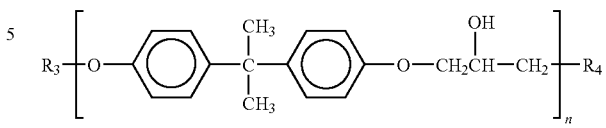

The epoxy group-containing phenoxy resin may generally be the one having 40,000 to 80,000 of weight-average molecular weight ($M_w$). The weight-average molecular weight ($M_w$) is determined by the GPC method under the following condition, for example.

Reference reagent: TSK reference polystyrene (A-500, A-2500, F-1, F-4, F-20, and F-128: manufactured by Toso Co., Ltd.)

Solvent: THF

Column: GF-1G7B+GF-7 MHQ (manufactured by Showa Denko K.K.)

From the point of giving favorable compatibility with the aromatic polyamide resin and of giving easy dispersion, and further from the point of attaining more effective suppression of flowability of the polyamide resin composition, the weight-average molecular weight ($M_w$) is preferably in a range from 50,000 to 60,000. In case of the $M_w$ is less than 50,000, much blister formation at injection and extrusion T-die molding is occurred, it possibly spoils performance of the polyamide resin composition. And, in case of the $M_w$ is exceeding 60,000, lack of flowability possibly spoils moldability of the polyamide resin composition.

Furthermore, in view of more effective suppression of flowability and increasing mechanical strength of the polyamide resin composition at the same blending rate, the epoxy group-containing phenoxy resin preferably has the epoxy equivalents above 10,000 g/eq, In case of the epoxy equivalents less than 10,000, much blister formation at injection and extrusion T-die molding is occurred, it possibly spoils performance of the polyamide resin composition. And possibly mechanical characteristics as represented by tensile strength is also spoiled by it.

The epoxy equivalent is the value determined in accordance with JIS K7236.

The polyamide resin composition according to this embodiment is structured by the above aromatic polyamide resin and the above epoxy group-containing phenoxy resin, where 30 to 50% by mass of the epoxy group-containing phenoxy resin is contained. The reason to specify the mixing rate of the epoxy group-containing phenoxy resin mixed in the polyamide resin composition to that range is that less than 30% by mass fails to attain the effect of suppressing the flowability of the polyamide resin composition, and that more than 50% by mass deteriorates the excellent characteristics such as heat resistance and water absorbency of the aromatic polyamide resin, both of which cases may not attain the polyamide resin composition having these improving effects. A further preferable mixing rate of the epoxy group-containing phenoxy resin is more than 35% by mass and not more than 45% by mass in view of, adding to the above given characteristics, improving physical properties such as elongation and tensile strength of the polyamide resin composition.

The polyamide resin composition may further contain a resin other than the aromatic polyamide resin and the epoxy group-containing phenoxy resin, within a range not to deteriorate the advantage of the present invention.

Various additives other than resin may further be added to the resin. Examples of these additives are:

tackiness agent such as alkylphenol resin, alkylphenol-acetylene resin, xylene resin, petroleum resin, coumarone-indene resin, terpene resin, rosin;

bromine compound such as poly-bromo-diphenyl-oxide, tetrabromo-bisphenolA;

halide flame retardant such as chlorinated paraffin, par-clorocyclodecane;

phosphorous flame retardant such as phosphate ester, halo-phosphate ester;

hydration metal compound such as hydrated alumina, magnesium hydrate;

flame retardant as antimony trioxide, boron compound;

common chemicals for blending in plastics, such as phenolic, phosphorous and sulphur antioxidant, heat stabilizer, light stabilizer, UV absorber, lubricant, pigment cross-linking agent, cross-linking assistant, silane-coupling agent, and titanate-coupling agent; and inorganic filler such as silica, clay, calcium carbonate, aluminum oxide, magnesium oxide, boron nitride, silicon nitride, and aluminum nitride, And, especially adding nanometers level particles of montmorillonite or 0.6 mm Kevler® by 0.1 to 5 parts by weight to 100 parts by weight of the polyamide resin composition, for example, improves the resin strength to more than 3 times.

Furthermore, adding any one of triallyl isocyanate, tetra-n-butoxide titanium, tris(2,3-epoxypropyl)isocyanate by 0.1 to 5 parts by weight to 100 parts by weight of the polyamide resin composition, for example, improves the resin strength to 3 times or more. For example, the triallyl isocyanate, tetra-n-butoxide titanium and tris(2,3-epoxypropyl)isocyanate put on sales as "TAIC", "B-1" and "TEPIC-G" available from Nippon Kasei Chemical, Nippon-soda Corp and Nissan Chemical Corp, respectively.

With those mixing components, the polyamide resin composition can be manufactured by a common mixing and blending means such as kneader, pressurized kneader, kneading roll, Bumbury's mixer, and twin-screw extruder. If necessary, it is possible to employ a method, in which a resin composition is blended within the cylinder of extruder after dry-blending.

As the wholly aromatic polyamide paper (aramid paper), it can be used for example a sheet-like material that comprises aramid fibrid and/or aramid fiber consisting of benzene ring except for the amide group, such as condensation polymer of phenylenediamine and phthalic acid. For the aramid paper, the thickness is preferably more than 50 μm in view of mechanical characteristics and keeping the shape, In case of less than 50 μm, the mechanical characteristics are deteriorated and it possibly causes a problem in keeping the shape and handling during transportation in manufacturing process.

And also, for the aramid paper, the basis weight is preferably 5 g/m$^2$ or more in view of mechanical characteristics and handling in manufacturing process. In case of less than 5 g/m$^2$, the mechanical strength is decreased and it possibly causes breaking during various handlings in manufacturing process of the laminate sheets.

Furthermore, the density of the aramid paper, which is calculated from the basis weight and the thickness of a given area, is usually in the range from 0.1 to 1.2 g/cm$^3$.

In addition, a third component may be added to the aramid paper to such an extent as not to spoil the advantage of the present invention. As the third component, for example, organic fibers such as polyphenylene sulfide fiber, polyetheretherketone fiber, polyester fiber, arylate fiber, liquid crystalline polyester fiber and polyethylene naphthalate fiber, and inorganic fibers such as glass fiber, rock wool, asbestos, boron fiber and alumina fiber can be cited.

For such aramid paper, one commercially available under the trade name "Nomex"® Paper from DuPont, or aramid paper with the treated surface disclosed in Kokai (unexamined patent publication) No. 2003-313770 may be used.

Figure 2:
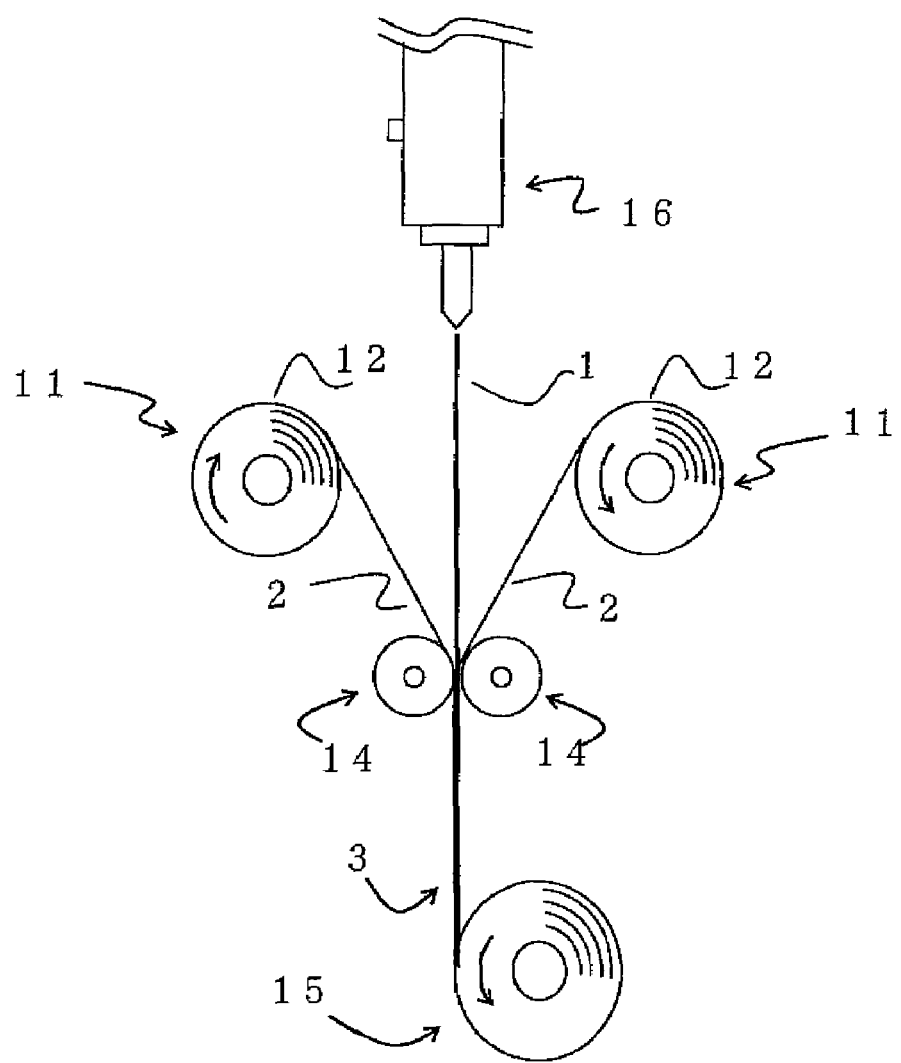
FIG. 2 is a schematic view showing a method of manufacturing a laminate sheet.

In order to form a laminate sheet 3 for an interphase insulation sheet for a motor using the wholly aromatic polyamide paper 2 and the polyamide resin composition 1, for example, a manufacturing method using equipments as shown in FIG. 2 may be employed.

Specifically, an apparatus has two feeding units 11 having rotational shafts disposed away from each other in parallel relationship on the right and left sides; an outlet slot that is directed downward is arranged substantially at the upper middle of these feeding units 11; a T-die extruder 16 having an outlet slot having substantially the same width as the wholly aromatic polyamide paper 2; squeeze rolls 14 installed at substantially the intermediate portion between the feeding units 11 and lower height thereof so as to be capable of overlapping the pieces of the wholly aromatic polyamide paper 2 fed out from the respective feeding units 11 together and laminating them together via the polyamide resin composition 1 discharged from the T-die extruder 16; and a take-up roll 15 for winding up the laminate sheet 3 which has passed the squeeze rolls 14. In this apparatus, wholly-aromatic-polyamide-paper rolls 12 are respectively mounted to the two feeding units 11 so as to be located at the same position in the lengthwise direction, and by using the feeding units 11, the pieces of the wholly aromatic polyamide paper are fed out from the wholly-aromatic-polyamide-paper rolls 12, passed between the squeeze rolls 14 and wound up on the take-up roll 15, while at the same time, the polyamide resin composition in molten state at a temperature in a range from the melting point to the decomposition temperature is discharged from the T-die extruder 16. At this time, by using a polyamide resin composition that contains an aromatic polyamide resin and an epoxy group-containing phenoxy resin having an epoxy group in the molecule and that the content of the epoxy group-containing phenoxy resin ranges from 30 to 50% by mass, variation in extrusion rate of the polyamide resin composition from a T-die, or the resin break owing to the lack of melting viscosity does not occur, and thus the thickness of the polyamide resin composition can be easily made uniform, and non-uniform insulating property of the laminate sheets 3 can be also suppressed.

Further, in this embodiment, because a laminate sheet having a moderate stiffness property is obtained by laminating with an aromatic polyamide composition, wholly aromatic polyamide paper is used as the sheet material. However the present invention shall not be limited by using the wholly aromatic polyamide as the sheet material.

In addition, because wholly aromatic polyamide gives a more excellent heat resistance and a lower water absorbency than the aromatic polyamide resin composition that is formed into sheets to be laminated together, and can make more effective the improving of the heat resistance and the water absorbency of the laminate sheet by the aromatic polyamide resin composition, a sheet material using wholly aromatic polyamide is employed. However, the present invention shall not be particularly limited by using the wholly aromatic polyamide as the sheet material.

In addition, for the reasons that such as heat resistance, hydrolysis resistance, electric-insulating property at room and high temperature and oil resistance can be made excellent and suitable layer insulating paper for a car motor can be obtained, this embodiment was described by taking, for example, a laminate sheet formed by laminating two pieces of wholly aromatic polyamide paper by an aromatic polyamide resin composition. However in the present invention, the use as the laminate sheet shall not be limited to interphase insulation paper for a motor.

In addition, the present invention may include a laminate sheet having more multilayered construction.

Further, from the points above mentioned, when a laminate sheet is used for electric insulating paper for a car motor, because wholly aromatic polyamide paper has a moderate stiffness, the preferable thickness range is from 50 to 250 μm, and the thickness of the polyamide resin composition used for the lamination of wholly aromatic polyamide paper, for example, may be from 1 to 400 μm.

EXAMPLE

The present invention is described below in more detail referring to the examples. These examples, however, do not limit the scope of the present invention.

(Formulation)

At first, aromatic polyamide resin compositions were formulated as follows.

Formulation Example 1

An aromatic polyamide resin (DuPont Zytel® HTN 501) prepared by ternary polymerization of hexamethylene diamine, 2-methylpentamethylene diamine, and terephthalic acid, and a phenoxy resin with epoxidized terminal, having about 52,000 of weight-average molecular weight, (an epoxy group-containing phenoxy resin), were mixed together at a rate of 35% by mass of the epoxy group-containing phenoxy resin, thereby obtaining a mixture of polyamide resin composition. The mixture was extruded to strand from a twin-screw extruder set in a range from a melting point to a decomposition temperature, while melting and blending the mixture. After cooled with water, the strand was cut to pellets by a pelletizer, thus obtained a polyamide resin composition.

Formulation Example 2

A polyamide resin composition was manufactured by the same procedure as that of Formulation Example 1 except that the mixing rate of the epoxy group-containing phenoxy resin was varied to 40% by mass.

Formulation Example 3

A polyamide resin composition was manufactured by the same procedure as that of Formulation Example 1 except that the mixing rate of the epoxy group-containing phenoxy resin was varied to 45% by mass.

Formulation Example 4

A polyamide resin composition was manufactured by the same procedure as that of Formulation Example 1 except that the epoxy group-containing phenoxy resin was replaced by a common phenoxy resin having about 52,000 of weight-average molecular weight and that the mixing rate of the phenoxy resin was varied to 30% by mass.

Formulation Example 5

A polyamide resin composition was manufactured by the same procedure as that of Formulation Example 4 except that the mixing rate was varied to 40% by mass.

Formulation Example 6

A polyamide resin composition was manufactured by the same procedure as that of Formulation Example 4 except that the mixing rate was varied to 50% by mass.

Formulation Example 7

A polyamide resin composition was manufactured by the same procedure as that of Formulation Example 2 except that the epoxy group-containing phenoxy resin was replaced by a bisphenol-A type epoxy resin having about 2,400 of epoxy equivalent, (trade name "Epicoat 1009", manufactured by Japan Epoxy Resin Co., Ltd.).

Formulation Example 8

A sole aromatic polyamide resin without additives was adopted as Formulation Example 8.

(Determination of Melting Point of Aromatic Polyamide)

The melting point of the aromatic polyamide was measured by the DSC method (Device used: "Pyris" available from PERKINELMER Corp.). In concrete terms, about 5 mg of the sample and separately about 5 mg of alumina as the reference were heated in a nitrogen gas atmosphere at 10° C./min of heating rate to determine the heat absorption. The point where the heat absorption becomes maximum near the temperature of inducing phase change was decided as the melting point. The observation revealed that the melting point of the aromatic polyamide resin used in examples and comparative examples was about 300° C.

(Flowability)

For Formulation Examples 2, 5, 7 and 8, the flowability was observed at a temperature higher by 10° C. or more than the melting point which was determined by the melting point measurement which observed temperature was in a region where the flowability does not significantly vary. That is, the melt flow rate (MFR) was determined at 310° C. and 320° C., respectively in accordance with JIS K7210. The determination was conducted by attaching an orifice of 0.5 mm in diameter and 8 mm in length to a cylinder of 9.5 mm in diameter, at the above temperature, applying 20 N of load. As a reference, MFR determination was given also at 330° C. which may induce decomposition of the resin.

The judgment was given on the following criterion based on the situation that resin processing such as film-forming where the resin is processed in a heated and melted state and where relatively high flowability is requested. Thus, the resin giving 20 or smaller MER observed in commonly applied resins was evaluated as ⊚, the resin giving more than 20 and not more than 30 of MFR was evaluated as ○, and the resin giving far larger than 30 of MFR or the resin which flew very little was evaluated as x. The result is shown in Table 1.

TABLE 1

| | MFR (judgment: g/10 min) | | MFR (reference) |
|---|---|---|---|
| | 310° C. | 320° C. | 330° C. |
| Formulation Example 2 | ⊚: 9.1 | ⊚: 17.4 | ○: 26.8 |
| Formulation Example 5 | X: 32.6 | X: 58.4 | X: 84.6 |
| Formulation Example 7 | X: 0 (*) | X: 0 (*) | X: 0 (*) |
| Formulation Example 8 | X: 49.6 | X: 109.1 | X: 152.3 |

(*) No flowability was observed.

From Table 1, it is found that a laminate sheet can be easily manufactured by using a resin composition, in which an epoxy group-containing phenoxy resin is added to an aromatic polyamide resin.

For Formulation Examples 1 to 6 and Formulation Example 8, respective films having about 0.2 to 0.5 mm in thickness were formed. The films were subjected to tensile test (200 mm/min of elastic stress rate, 100 mm of distance between marked lines, and 100 mm of distance between chucks) in accordance with JS C2111. Table 2 shows thus observed tensile strength and elongation.

TABLE 2

|  | Tensile strength (MPa) | Elongation (%) |
|---|---|---|
| Formulation Example 1 | 58.9 | 4.5 |
| Formulation Example 2 | 60.9 | 17.9 |
| Formulation Example 3 | 63.0 | 31.4 |
| Formulation Example 4 | 58.5 | 6.5 |
| Formulation Example 5 | 59.0 | 6.0 |
| Formulation Example 6 | 49.7 | 4.4 |
| Formulation Example 8 | 52.5 | 11.0 |

Table 2 shows that compared with Formulation Example 8 (sole aromatic polyamide resin), Formulation Examples 1 to 3 increase the tensile strength with the increase in the quantity of epoxy group-containing phenoxy resin, and that particularly Formulation Examples 2 and 3 increase the elongation also. The elongation become high when the quantity of epoxy group-containing phenoxy resin is in a range from more than 35% by mass and not more than 45% by mass.

In contrast, common phenoxy resin (Formulation Examples 4 to 6) shows no improvement in the tensile strength and the elongation.

Moreover, laminate sheets of the following example and comparative example were manufactured and the heat resistance and the water absorbency were evaluated.

EXAMPLE

Using wholly aromatic polyamide paper having a thickness of 50 μm as the sheet material (DuPont Nomex® N415), a laminate sheet was so manufactured that the thickness of the polyamide resin composition of above described Formulation Example 2 becomes 200 μm.

Comparative Example 1

Except that the polyamide resin composition of Formulation Example 2 is replaced by Formulation Example 8 (sole aromatic polyamide), the laminate sheet was manufactured in the same manner as Formulation Example 1.

Comparative Example 2

Except that the polyamide resin composition of Formulation Example 2 is replaced by Formulation Example 5 (aromatic polyamide plus common phenoxy resin), the laminate sheet was manufactured in the same manner as Formulation Example 1.

Comparative Example 3

In place of the laminate sheet, a sole polyethylene naphthahalate sheet (hereinafter referred to "PEN", made by Teijin DuPont Films Ltd., Trade name "Teonex") having a thickness of 250 μm is designated as Comparative Example 3.

(Evaluation of Heat Resistance and Water Absorbency)

Using the laminate sheets of Example 1 and Comparative Examples 1 to 2 and the PEN sheet of Comparative Example 3, the pressure cooker test (hereinafter referred to "PCT") of 150° C.×0.48 MPa was performed by "EHS-41M" manufactured by ESPEC Corporation, and at the initial time, after 100 h, 250 h and 500 h, the tensile test was performed at a rate of 200 mm/min, and when the tensile strength at initial time is 100%, the percentage of retention after respective PCT was found. In addition, the change of volume resistivity and the change of dielectric breakdown voltage were also determined. The results are shown in FIG. 3($a$) to FIG. 3($c$).

Figure 3A:
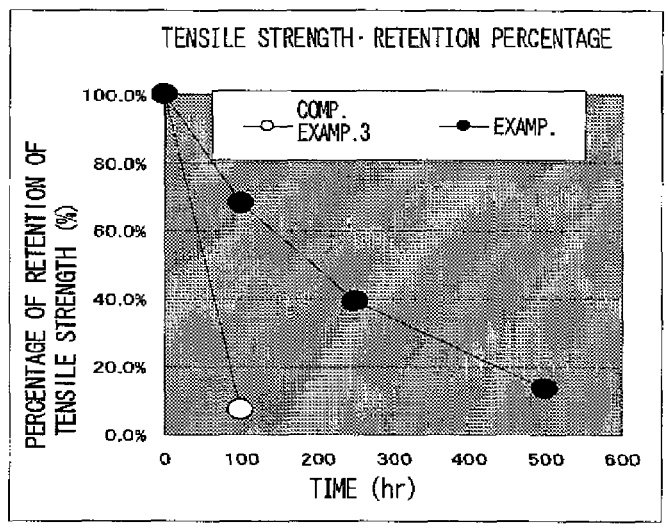
FIG. 3($a$) is a graph of the percentage of retention of tensile strength by PCT, FIG. 3($b$) is a graph of the volume resistivity change by PCT, and FIG. 3($c$) is a graph of dielectric breakdown voltage change by PCT.
Figure 3B:
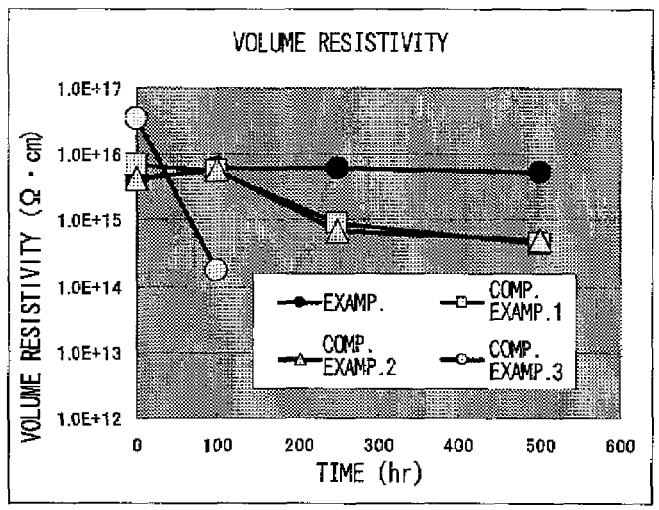
Figure 3C:
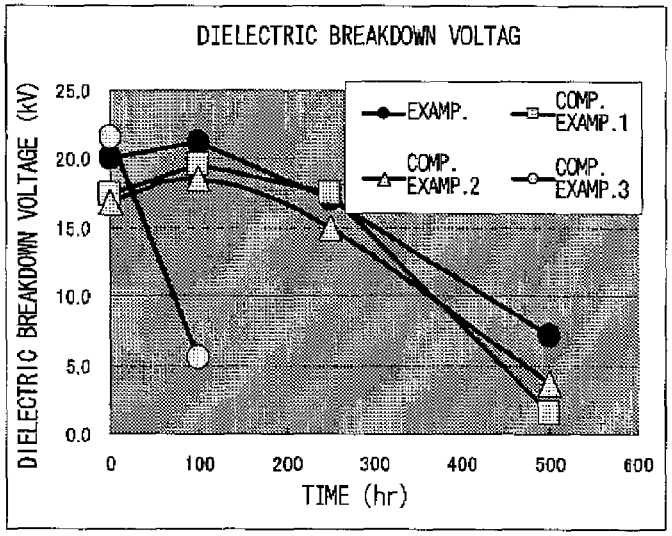

From the results of FIG. 3, it is found that by using an aromatic polyamide resin composition for a laminate sheet, the heat resistance and the water absorbency are improved. In addition, it is found that such a laminate sheet is suitable for insulating paper used for such as car motor.

(Evaluation of Heat Resistance)

By using the laminate sheets of Example 1 and Comparative Examples 1, 2, the heat aging test was performed at 180° C., and at the initial time, after 100 h, 250 h and 500 h, the tensile strength and the elongation were found, and when the tensile strength at the initial time is 100%, the percentage of retention was calculated. The results are shown in FIGS. 4($a$) and 4($b$).

Figure 4A:
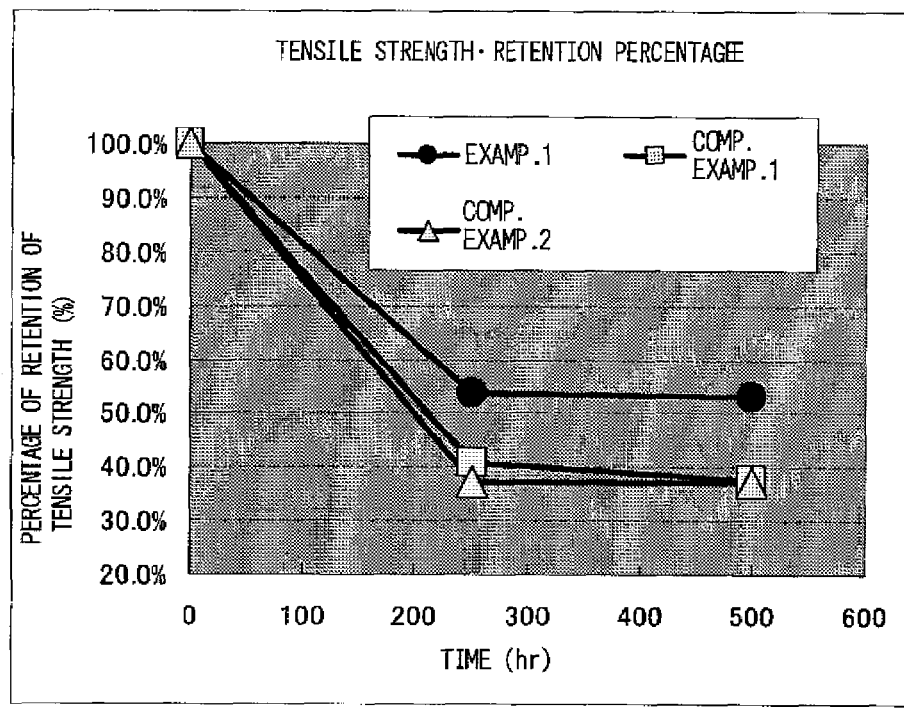
FIG. 4(a) is a graph of the percentage of retention of tensile strength by aging test at 180° C.
Figure 4B:
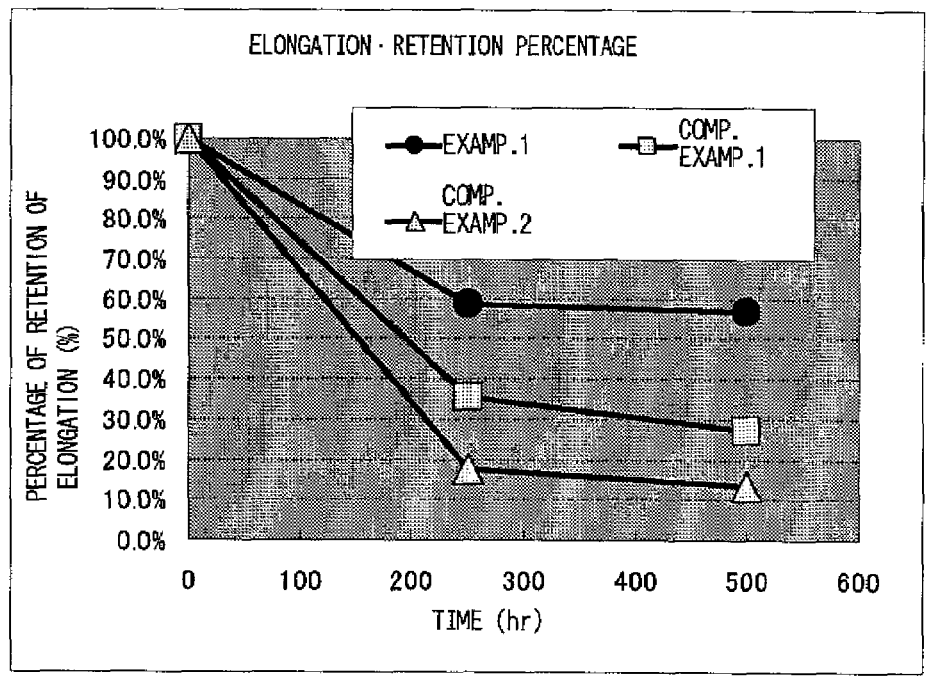
FIG. 4(b) is a graph of the volume resistivity change by aging test at 180° C.

From the results of FIG. 4, it is found that by using an aromatic polyamide resin composition for a laminate sheet, a laminate sheet having an excellent heat resistance can be obtained. In addition, it is found that such a laminate sheet is suitable for insulating paper for such as car motor.

The invention claimed is:

1. A laminate sheet prepared by laminating plural sheet materials by a resin composition, wherein the resin composition is comprised of an aromatic polyamide resin and an epoxy group-containing phenoxy resin having an epoxy group in the molecule, and the resin composition is a polyamide resin composition that contains 30 to 50% by mass of the epoxy group-containing phenoxy resin.

2. The laminate sheet according to claim 1, wherein nonwoven cloth is used as the sheet materials.

3. The laminate sheet according to claim 1, wherein paper is used as the sheet materials.

4. The laminate sheet according to claim 1, wherein wholly aromatic polyamide sheets are used as the sheet materials.

5. The laminate sheet according to claim 4, wherein wholly aromatic polyamide paper is used as the wholly aromatic polyamide sheets.

6. An insulation sheet for a motor comprised of the laminate sheet as recited in any one of claims 2, 3, 4 or 5.

7. An interphase insulation sheet for a motor comprised of the laminate sheet as recited in any one of claims 2, 3, 4 or 5.

8. An insulation sheet for a transformer comprised of the laminate sheet as recited in any one of claims 2, 3, 4 or 5.

9. An insulation sheet for a bus bar comprised of the laminate sheet as recited in any one of claims 2, 3, 4 or 5.

* * * * *